(12) United States Patent
Joo et al.

(10) Patent No.: US 10,830,118 B2
(45) Date of Patent: Nov. 10, 2020

(54) AFTER TREATMENT SYSTEM AND AFTER TREATMENT METHOD FOR LEAN-BURN ENGINE

(71) Applicants: Hyundai Motor Company, Seoul (KR); KIA Motors Corporation, Seoul (KR)

(72) Inventors: Nahm Roh Joo, Gyeonggi-do (KR); ChangHo Jung, Gyeonggi-do (KR); Chang Hwan Kim, Gyeonggi-do (KR); Seung Jae Yi, Superior Township, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 37 days.

(21) Appl. No.: 16/263,615

(22) Filed: Jan. 31, 2019

(65) Prior Publication Data

US 2020/0248608 A1 Aug. 6, 2020

(51) Int. Cl.
*F01N 3/10* (2006.01)
*F01N 3/20* (2006.01)
*B01D 53/94* (2006.01)

(52) U.S. Cl.
CPC ........... *F01N 3/2073* (2013.01); *F01N 3/101* (2013.01); *F01N 3/103* (2013.01); *F01N 3/208* (2013.01); *F01N 3/2066* (2013.01); *B01D 53/945* (2013.01); *B01D 53/9477* (2013.01); *B01D 53/9481* (2013.01); *B01D 53/9495* (2013.01); *B01D 2255/40* (2013.01); *B01D 2255/904* (2013.01); *B01D 2255/908* (2013.01); *B01D 2255/911* (2013.01); *B01D 2258/012* (2013.01); *F01N 2610/02* (2013.01); *F01N 2900/1404* (2013.01); *F01N 2900/1622* (2013.01); *F01N 2900/1624* (2013.01)

(58) Field of Classification Search
CPC ........ F01N 3/101; F01N 3/103; F01N 3/2066; F01N 3/2073; F01N 3/208; F01N 2610/02; F01N 2900/1622; F01N 2900/1624
See application file for complete search history.

(56) References Cited

U.S. PATENT DOCUMENTS

| | | |
|---|---|---|
| 2010/0043402 A1 | 2/2010 | Perry et al. |
| 2010/0139248 A1 | 6/2010 | Najt et al. |
| 2010/0212295 A1 | 8/2010 | Narayanaswamy et al. |
| 2010/0326052 A1 | 12/2010 | Sun |
| 2011/0202253 A1 | 8/2011 | Perry et al. |
| 2011/0288750 A1 | 11/2011 | Wermuth et al. |
| 2012/0060472 A1 | 3/2012 | Li et al. |
| 2015/0064085 A1* | 3/2015 | Weigert ............... B01D 53/944 423/213.5 |

(Continued)

*Primary Examiner* — Audrey K Bradley
(74) *Attorney, Agent, or Firm* — Brinks Gilson & Lione

(57) ABSTRACT

An after treatment method for a lean-burn engine is disclosed. The after treatment method is configured to control an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine. In the after treatment method, a rich air/fuel ratio (AFR) is controlled in multiple phases in response to detecting that conversion to the rich AFR is desired.

16 Claims, 13 Drawing Sheets

(56) References Cited

U.S. PATENT DOCUMENTS

2015/0174529 A1* 6/2015 Irisawa .............. B01D 53/9431
                                                        422/114
2016/0230632 A1* 8/2016 Smith .................. F01N 13/107
2017/0306818 A1* 10/2017 Ito ........................... F01N 3/208

* cited by examiner

AFTER TREATMENT SYSTEM AND AFTER TREATMENT METHOD FOR LEAN-BURN ENGINE

FIELD

The present disclosure relates to an after treatment system and an after treatment method for a lean-burn engine.

BACKGROUND

The statements in this section merely provide background information related to the present disclosure and may not constitute prior art.

Vehicles may be provided with at least one catalytic converter for reducing emission (EM) contained in an exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

A lean-burn engine among gasoline engines improves fuel efficiency by burning a lean air/fuel mixture. The lean-burn engine burns the lean air/fuel mixture, so air/fuel ratio (AFR) of the exhaust gas is also lean. However, when the AFR is lean, the TWC slips the NOx without reducing all of the NOx contained in the exhaust gas. Accordingly, a vehicle equipped with the lean-burn engine may include a selective catalytic reduction (SCR) catalyst for purifying the NOx slipped from the TWC. The SCR catalyst used in the vehicle equipped with the lean-burn engine may be a passive type SCR catalyst.

When the AFR is rich, the TWC reduces the NOx to produce NH3 and the NH3 generated in the TWC is stored in the passive type SCR catalyst. When the AFR is lean, the passive type SCR catalyst purifies the NOx contained in the exhaust gas using the stored $NH_3$.

The lean-burn engine equipped with the TWC and the passive type SCR catalyst should adjust the AFR to be rich by increasing fuel for a predetermined duration in order to store a sufficient amount of the $NH_3$ in the passive type SCR catalyst. If the amount of the NOx discharged from the lean-burn engine increases, the number and duration where the lean-burn engine operates at the rich AFR also increase. Therefore, fuel economy may be deteriorated.

We have discovered that the CO and the HC may be slipped from the TWC at the rich AFR. The CO and the HC slipped from the TWC may not be purified and be discharged outside the vehicle. Therefore, additional catalytic converters or controls may be employed to reduce the CO and the HC slipped when the AFR is controlled to be rich to generate $NH_3$.

The above information disclosed in this Background section is only for enhancement of understanding of the background of the disclosure and therefore it may contain information that does not form the prior art that is already known to a person of ordinary skill in the art.

SUMMARY

The present disclosure has been made in an effort to provide an after treatment system for a lean-burn engine having advantages of increasing NH3 generation at a rich air/fuel ratio.

Another aspect of the present disclosure provides an after treatment system for a lean-burn engine having further advantages of reducing CO and HC discharged to an exterior of a vehicle Yet another aspect of the present disclosure provides an after treatment method having further advantages of reducing a duration for which a rich air/fuel ratio is maintained to reduce slip amount of CO and HC, while increasing NH3 generation for the duration.

An after treatment system for a lean-burn engine according to an aspect of the present disclosure may include: an exhaust pipe connected to the lean-burn engine and through which an exhaust gas generated in the lean-burn engine flows; an ammonia production catalyst module mounted on the exhaust pipe, capable of purifying emission contained in the exhaust gas, and generating ammonia ($NH_3$) using nitrogen oxide (NOx) contained in the exhaust gas or the NOx stored therein at a rich air/fuel ratio (AFR); a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$; a CO clean-up catalyst (CUC) mounted on the exhaust pipe downstream of the SCR catalyst and purifying CO contained in the exhaust gas; and a controller detecting information on the AFR and temperature of the exhaust gas and controlling the AFR of the exhaust gas based on the information on the AFR and the temperature of the exhaust gas, wherein, in response to detecting that the rich AFR is desired, the controller is configured to sequentially perform a rich control of first phase in which consumption of oxygen storage capacity (OSC) in the ammonia production catalyst module is accelerated, a rich control of second phase in which the OSC is completely consumed, and a rich control of third phase in which the $NH_3$ is generated before the CO is slipped from the CUC.

The AFR may be controlled to be a first AFR in the rich control of first phase, the AFR may be controlled to be a second AFR in the rich control of second phase, and the AFR may be controlled to be a third AFR in the rich control of third phase.

The first AFR may be greater than the second AFR, and the second AFR may be greater than the third AFR based on a detected value of an oxygen sensor mounted at an upstream of the ammonia production catalyst module.

The controller may further perform a rich control of fourth phase in which the NH3 is further generated to a rich duration at which a slip amount of the CO accumulated downstream of the CUC reaches a predetermined amount.

The AFR may be controlled to be a fourth AFR in the rich control of fourth phase, wherein the fourth AFR is greater than the first AFR to the third AFR based on a detected value of an oxygen sensor mounted at an upstream of the ammonia production catalyst module.

The rich duration may be calculated according to the fourth AFR and a temperature of the CUC.

The rich control of first phase may be performed for a predetermined duration.

The predetermined duration may be calculated according to the OSC and the first AFR.

The ammonia production catalyst module may include: a three-way catalyst (TWC) purifying hydrocarbon (HC), the CO, and the NOx contained in the exhaust gas; and an ammonia production catalyst (APC) mounted on the exhaust pipe downstream of the TWC, storing the NOx at a lean AFR, and generating $H_2$, releasing the stored NOx, and generating the $NH_3$ using the released NOx and the generated $H_2$ at the rich AFR.

The after treatment system may further include a particulate filter disposed between the TWC and the APC or between the APC and the SCR catalyst, wherein the particulate filter traps particulate matter in the exhaust gas.

An after treatment method according to another aspect of the present disclosure is configured to control an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine.

The after treatment method may include: operating the engine at a lean AFR; calculating an amount of $NH_3$ stored in the SCR catalyst; determining whether conversion to a rich AFR may be desired; operating, when the conversion to the rich AFR is desired, the engine at a first AFR for a predetermined duration; and operating the engine at a second AFR until oxygen storage capacity (OSC) in the ammonia production catalyst module is completely consumed.

The first AFR may be less than the second AFR based on a detected value of an oxygen sensor mounted at an upstream of the ammonia production catalyst module.

The predetermined duration may be calculated according to the OSC and the first AFR The after treatment method may further include operating the engine at a third AFR before CO is slipped from the CUC.

The third AFR may be greater than the second AFR based on a detected value of an oxygen sensor mounted at an upstream of the ammonia production catalyst module.

The after treatment method may further include operating the engine at a fourth AFR to a rich duration at which a slip amount of the CO accumulated downstream of the CUC reaches a predetermined amount.

The fourth AFR may be greater than the first AFR to the third AFR based on a detected value of an oxygen sensor mounted at an upstream of the ammonia production catalyst module.

The rich duration may be calculated according to the fourth AFR and a temperature of the CUC.

In one aspect, the determining whether conversion to a rich AFR is desired may include calculating an amount of NOx which will flow into the SCR catalyst. The conversion to the rich AFR may be determined to be desired when the amount of the $NH_3$ stored in the SCR catalyst is smaller than an amount of the $NH_3$ required to purify the amount of the NOx which will flow into the SCR catalyst.

In another aspect, the determining whether conversion to a rich AFR is desired may include comparing the amount of the $NH_3$ stored in the SCR catalyst with a predetermined $NH_3$ lower threshold. The conversion to the rich AFR may be determined to be desired when the amount of the $NH_3$ stored in the SCR catalyst is smaller than the predetermined $NH_3$ lower threshold.

According to aspects of the present disclosure, $NH_3$ amount supplied to an SCR catalyst at a rich AFR is increased by disposing an APC between a TWC and the SCR catalyst. Therefore, the number and duration where an engine operates at the rich AFR can be reduced, thereby improving fuel economy.

In addition, a CUC is disposed downstream of the ACR catalyst to purify CO slipped from the TWC and the APC.

Further, a duration for which the rich AFR is maintained is reduced to reduce slip of the CO and the HC, while increasing $NH_3$ generation for the duration by performing rich control in at least two phases. Therefore, it is possible to reduce emissions with improving fuel economy.

In addition, other effects of the aspects of the present disclosure should be directly or implicitly described in the description provided herein. Various effects predicted according to the aspects of the present disclosure will be disclosed in the description provided herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The aspects herein may be better understood by referring to the following description in conjunction with the accompanying drawings in which like reference numerals indicate identically or functionally similar elements, of which:

Figure 1:
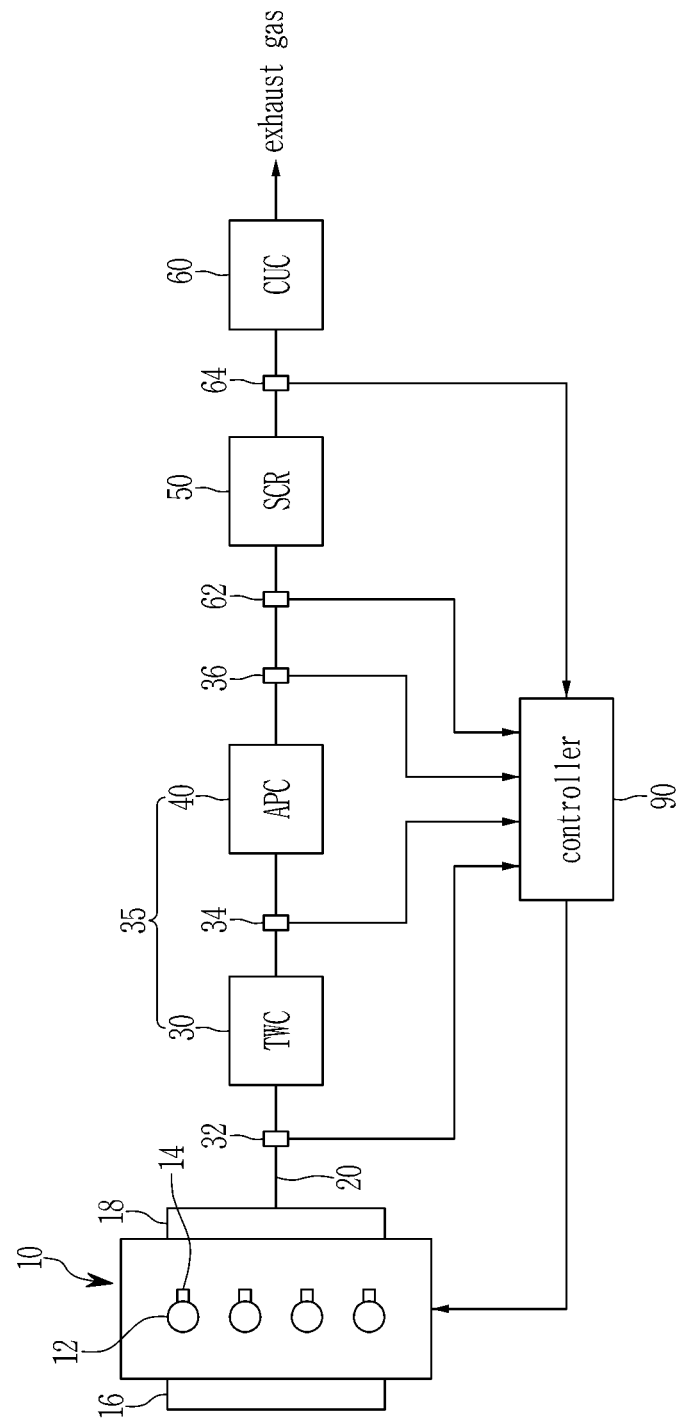
FIG. 1 is a schematic diagram of an after treatment system for a lean-burn engine according to an aspect of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular aspects only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, aspects of the present disclosure will be described in detail with reference to the accompanying drawings.

FIG. 1 is a schematic diagram of an after treatment system for a lean-burn engine according to an aspect of the present disclosure.

As shown in FIG. 1 an after treatment system according to an aspect of the present disclosure includes an engine 10, an exhaust pipe 20, an ammonia production catalyst module 35, a selective catalytic reduction (SCR) catalyst 50, and a CO clean-up catalyst (CUC) 60.

The engine 10 burns an air/fuel mixture to convert chemical energy into mechanical energy. The engine 10 is connected to an intake manifold 16 to flow air into a combustion chamber 12. An exhaust gas generated in combustion process is collected in an exhaust manifold 18 and then flows out from the engine 10. The combustion chamber 12 is equipped with a spark plug 14 to ignite the air/fuel mixture within the combustion chamber 12. The engine 10 may be a gasoline engine. Depending on types of gasoline engines, fuel may be directly injected into the combustion chamber 12 or the air/fuel mixture may be supplied to the combustion chamber 12 via the intake manifold 16. In addition, the engine 10 may be a lean-burn engine. Therefore, the engine 10 operates at a lean air/fuel ratio (AFR) except for special driving conditions.

The exhaust pipe 20 is connected to the exhaust manifold 18 to discharge the exhaust gas to an outside of the vehicle. The exhaust pipe 20 is equipped with the ammonia production catalyst module 35, the SCR catalyst 50, and the CUC 60 to purify or remove emission contained in the exhaust gas.

The ammonia production catalyst module 35 includes a three-way catalyst (TWC) 30 and an ammonia production catalyst (APC) 40. The TWC 30 and the APC 40 may be disposed in one housing but are not limited thereto. The ammonia production catalyst module 35 can generate $NH_3$ using NOx contained in the exhaust gas or stored in the ammonia production catalyst module 35 at a rich AFR. The ammonia production catalyst module 35 contains an oxygen storage material having oxygen storage capacity (OSC).

The TWC 30 is disposed on the exhaust pipe 20 through which the exhaust gas discharged from the engine 10 flows, and harmful materials including CO, HC, and NOx contained in the exhaust gas are converted into harmless components by an oxidation-reaction reaction in the TWC 30. Particularly, the TWC 30 can reduce the NOx contained in the exhaust gas into $NH_3$ at the rich AFR. At this time, the TWC 30 may not purify the CO and the HC in the exhaust gas sufficiently and may slip the CO and the HC therefrom. In addition, the TWC 30 oxidizes the CO and the HC contained in the exhaust gas at the lean AFR. Since the TWC 30 is well known to a person of an ordinary skill in the art, a detailed description thereof will be omitted.

The APC 40 is disposed on the exhaust pipe 20 at a downstream of the TWC 30. The APC 40 stores the NOx contained in the exhaust gas at the lean AFR, and generates $H_2$ to release the stored NOx and generates $NH_3$ using the released NOx and the generated $H_2$ at the rich AFR.

In one aspect, the APC 40 includes 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC 40.

In another aspect, the APC 40 includes 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of the composite of MgO and $Al_2O_3$, and 0-10 wt % of the additive based on the total weight of the APC.

The additive is added for the performance improvement of $CeO_2$ and $Al_2O_3$ and includes at least one of La, Zr, Mg and Pr.

The Pt contained in the APC 40 functions to oxidize the NOx for the APC 40 to store the NOx. In addition, the Pt increases an amount of $H_2$ generated in the APC 40.

The Pd contained in the APC 40 improves heat resistance of the APC 40. Since the APC 40 is disposed close to the engine 10, a temperature of the APC 40 can rise to 950° C. Therefore, the Pd is added in the APC 40 to improve heat resistance.

In order to increase the $NH_3$ generation and the $H_2$ generation, a weight ratio of the Pt to the Pd in the APC 40 may be 3:1-7:1. In one aspect, the weight ratio of the Pt to the Pd in the APC 40 may be 3:1-5:1.

The Rh contained in the APC 40 purifies the NOx contained in the exhaust gas at a stoichiometric AFR.

The Ba and the $CeO_2$ contained in the APC 40 is configured to store the NOx in nitrate form. The $CeO_2$ contains the oxygen storage material.

In addition, the $CeO_2$ increases $H_2$ generation. However, if the APC 40 contains large amounts of the $CeO_2$, the generated $NH_3$ can be reoxidized. Thus, the APC 40 may include 10-30 wt % of $CeO_2$ based on a total weight of the APC 40.

The composite of MgO and $Al_2O_3$ contained in the APC 40 functions as a substrate. The composite of MgO and $Al_2O_3$ may include 15-25 wt % of MgO based on a total weight of the composite of MgO and $Al_2O_3$. The MgO enhances thermal stability of the Ba.

The SCR catalyst 50 is mounted on the exhaust pipe 20 at a downstream of the APC 40. The SCR catalyst 50 stores the $NH_3$ generated in the ammonia production catalyst module 35 (i.e., the TWC 30 and the APC 40) at the rich AFR and reduces the NOx contained in the exhaust gas using the stored $NH_3$ at the lean AFR. This type of the SCR catalyst 50 may be referred to as a passive type SCR catalyst 50.

The SCR catalyst 50 may be composed of one or a combination of a zeolite catalyst and a metal catalyst supported in a porous $Al_2O_3$. At least one of Cu, Pt, Mn, Fe, Co, Ni, Zn, Cs and Ga may be ion-exchanged in the zeolite catalyst. In the metal catalyst supported in the porous $Al_2O_3$, at least one metal among Pt, Pd, Rh, Ir, Ru, W, Cr, Mn, Fe, Co, Cu, Zn and Ag may be supported in the porous $Al_2O_3$.

The CUC 60 is mounted on the exhaust pipe 20 at a downstream of the SCR catalyst 50. The CUC 60 purifies the CO contained in the exhaust gas. Particularly, the CO may be slipped from the ammonia production catalyst module 35 (i.e., the TWC 30 and the APC 40) at the rich AFR. Therefore, emission of the CO to the outside of the vehicle can be prevented or inhibited by disposing the CUC 60 at the most downstream of the after treatment system. The CUC 60 includes Pt, Pd, Rh, and Ba supported in $CeO_2$ and $Al_2O_3$.

In one aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-10 wt % of an additive based on a total weight of the CUC 60.

In another aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-20 wt % of an additive based on a total weight of the CUC 60.

The additive is added for improving performance of the $CeO_2$ and the $Al_2O_3$ and includes at least one of La, Zr, Mg and Pr.

The CUC 60 is mainly composed of Pt—$CeO_2$. Here, the Pt functions to oxidize the CO, and the $CeO_2$ contains an oxygen storage material having oxygen storage capacity (OSC) to help oxidation of the CO at low temperature at the lean AFR. Pd/$Al_2O_3$ also plays a role similar to the Pt/$CeO_2$, but in one form an amount of the Pt/$CeO_2$ may be greater than that of the Pd/$Al_2O_3$, which may improve oxidation ability at the low temperature.

The Ba contained in the CUC 60 functions to remove a small amount of the NOx that is not removed from the SCR catalyst 50 when the AFR is rich.

The Rh included in the CUC 60 is intended to promote reduction of the NOx when the AFR is rich.

The exhaust pipe 20 may be equipped with a plurality of sensors 32, 34, 36, 62, and 64 for detecting the AFR of the exhaust gas and operation of the catalysts 30, 40, 50 and 60.

A first oxygen sensor 32 is mounted on the exhaust pipe 20 at an upstream of the TWC 30, detects $O_2$ concentration in the exhaust gas at the upstream of the TWC 30, and transmits a signal corresponding thereto to a controller 90. The AFR (it will hereinafter be referred to as 'A') of the exhaust gas described herein may refer to a value detected by the first oxygen sensor 32. In addition, an AFR control described here may refer to controlling the AFR of the exhaust gas to be a target AFR.

A second oxygen sensor 34 is mounted on the exhaust pipe 20 at the downstream of the TWC 30, detects $O_2$ concentration in the exhaust gas at the downstream of the TWC 30, and transmits a signal corresponding thereto to the controller 90.

A third oxygen sensor 36 is mounted on the exhaust pipe 20 at the downstream of the APC 40, detects $O_2$ concentration in the exhaust gas at the downstream of the APC 40 (i.e., the ammonia production catalyst module 35), and transmits a signal corresponding thereto to the controller 90. A value detected by the third oxygen sensor 36 is used to determine whether the OSC of the ammonia production catalyst module 35 is completely consumed.

A first temperature sensor 62 is mounted on the exhaust pipe 20 at an upstream of the SCR catalyst 50, detects a temperature of the exhaust gas at the upstream of the SCR catalyst 50, and transmits a signal corresponding thereto to the controller 90.

A second temperature sensor 64 is mounted on the exhaust pipe 20 at the downstream of the SCR catalyst 50, detects the temperature of the exhaust gas at the downstream of the SCR catalyst 50, and transmits a signal corresponding thereto to the controller 90.

Figure 4:
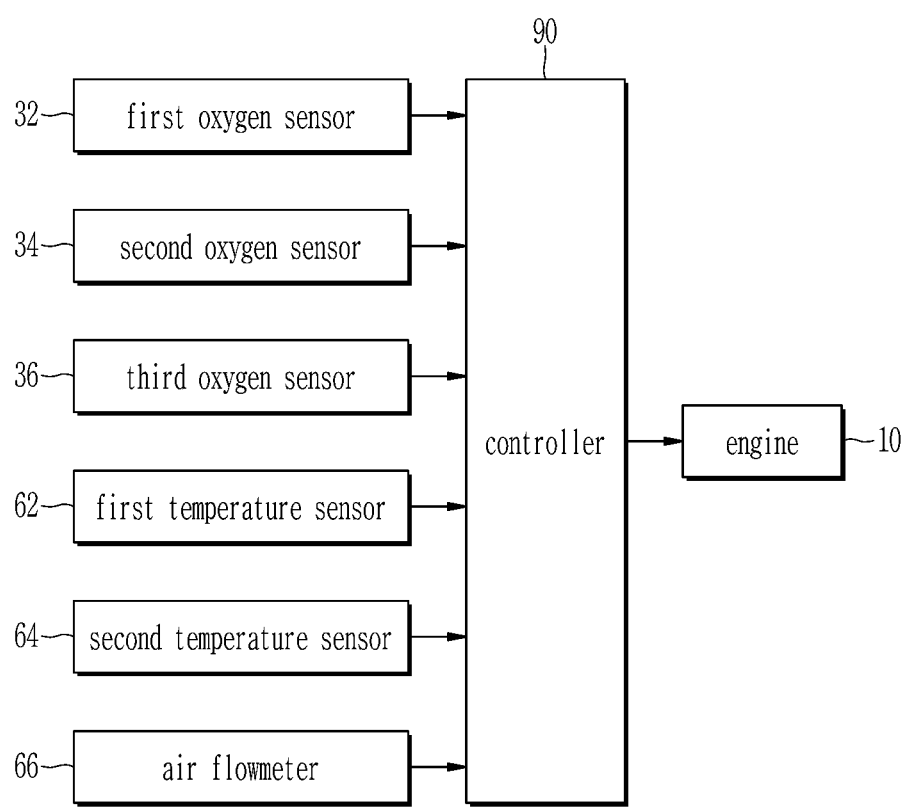
FIG. 4 is a block diagram of an after treatment system for a lean-burn engine according to an aspect of the present disclosure.

In addition to the sensors 32, 34, 36, 62, and 64 described herein, the after treatment system may further include various sensors. For example, additional temperature sensors can be mounted on the exhaust pipe 20 at the upstream and the downstream of the TWC 30 to detect the temperature of the exhaust gas at the upstream and the downstream of the TWC 30, respectively. In addition, as shown in FIG. 4, the after treatment system may further include an air flowmeter 66. Further, the after treatment system may further include a NOx sensor, an HC sensor or a CO sensor mounted on the exhaust pipe 20, and concentration of emission contained in the exhaust gas can be detected via these sensors.

The controller 90 is electrically connected to the sensors 32, 34, 36, 62, 64 and 66 to receive the signals corresponding to the detected values by the sensors 32, 34, 36, 62, 64 and 66, and determines driving condition of the vehicle, the AFR, and the temperatures of the catalysts 30, 40, 50, and 60 based on the signals. The controller 90 can control ignition timing, fuel injection timing, fuel amount, etc., by controlling the engine 10 based on the determination results. The controller 90 may be implemented with at least one processor executed by a predetermined program and the predetermined program may be programmed to perform each step of an after treatment method according to an aspect of the present disclosure.

Figure 2:
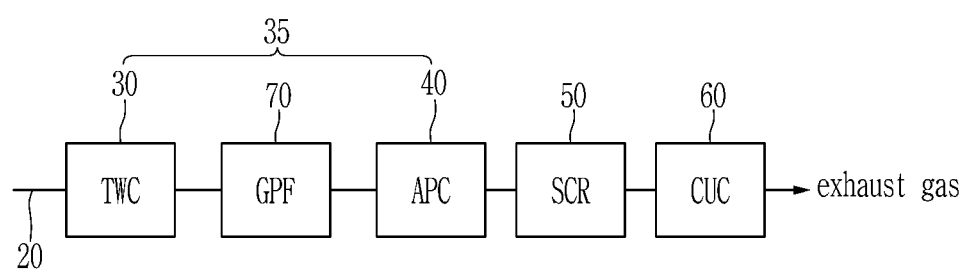
FIG. 2 is a schematic diagram of an after treatment system for a lean-burn engine according to another aspect of the present disclosure.

FIG. 2 is a schematic diagram of an after treatment system for a lean-burn engine according to another aspect of the present disclosure. The after treatment system shown in FIG. 2 is a modification of the after treatment system shown in FIG. 1.

As shown in FIG. 2, the after treatment system according to another aspect of the present disclosure is equipped with the TWC 30, a particulate filter (Gasoline Particulate Filter; GPF) 70, the APC 40, the SCR catalyst 50, and the CUC 60 sequentially disposed on the exhaust pipe 20. Since the TWC 30, the APC 40, the SCR catalyst 50, and the CUC 60 are described above, detailed description thereof will be omitted.

The particulate filter 70 is mounted on the exhaust pipe 20 at a downstream of the TWC 30, traps the particulate matter contained in the exhaust gas, and burns the trapped particulate matter. The particulate filter 70 is provided with inlet cells and outlet cells alternately disposed in a housing, and a wall is disposed between the inlet cell and the outlet cell. The inlet cell has an end that is opened and the other end that is blocked, and the outlet cell has an end that is blocked and the other end that is opened. The exhaust gas flows into the particulate filter 70 through the opened end of the inlet cell, flows to the outlet cell through the wall, and flows out to an outside of the particulate filter 70 through the opened end of the outlet cell. When the exhaust gas passes through the wall, the particulate filter contained in the exhaust gas does not pass through the wall and remains in the inlet cell.

Figure 3:
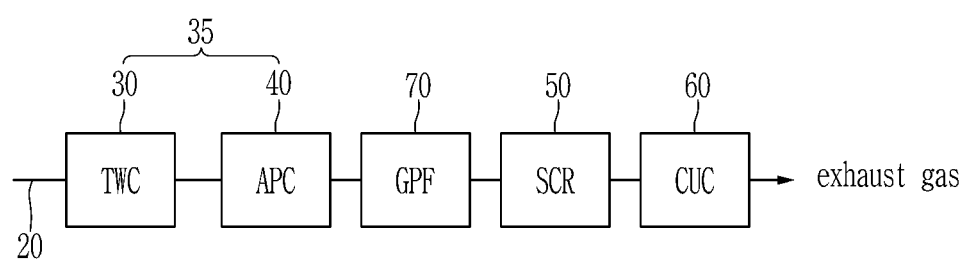
FIG. 3 is a schematic diagram of an after treatment system for a lean-burn engine according to other aspect of the present disclosure.

FIG. 3 is a schematic diagram of an after treatment system for a lean-burn engine according to other aspect of the present disclosure. The after treatment system shown in FIG. 3 is a modification of the after treatment system shown in FIG. 1.

As shown in FIG. 3, the after treatment system according to other aspect of the present disclosure is equipped with the TWC 30, the APC 40, the particulate filter 70, the SCR catalyst 50, and the CUC 60 sequentially disposed on the exhaust pipe 20. Since the TWC 30, the APC 40, the particulate filter 70, the SCR catalyst 50, and the CUC 60 are described above, detailed description thereof will be omitted.

FIG. 4 is a block diagram of an after treatment system for a lean-burn engine according to an aspect of the present disclosure.

FIG. 4 illustrates a simple example of inputs and outputs of the controller 90 to implement the after treatment system according to aspects of the present disclosure. It should be understood that the inputs and the outputs of the controller 90 according to aspects of the present disclosure are not limited to the example illustrated in FIG. 4.

As shown in FIG. 4, the controller 90 is electrically connected to the first, second, and third oxygen sensors 32, 34, and 36, the first and second temperature sensors 62 and a 64, and the air flowmeter 66, and receives the signals corresponding to the values detected by the sensors 32, 34, 36, 62, 64 and 66.

The first oxygen sensor 32 detects the concentration of the $O_2$ contained in the exhaust gas at the upstream of the TWC 30 and transmits the signal corresponding thereto to the controller 90. The second oxygen sensor 34 detects the concentration of the $O_2$ contained in the exhaust gas at the downstream of the TWC 30 and transmits the signal corresponding thereto to the controller 90. The controller 90 can determine whether the TWC 30 is operating normally based on the signals of the first and second oxygen sensors 32 and 34, and performs the AFR control of the engine 10.

In addition, the third oxygen sensor 36 detects the concentration of $O_2$ contained in the exhaust gas at the downstream of the ammonia production catalyst module 35 and transmits the signal corresponding thereto to the controller 90. The controller 90 determines whether the OSC of the ammonia production catalyst module 35 is completely consumed based on the signal of the third oxygen sensor 36. For example, if the signal of the third oxygen sensor 36 indicates that the AFR at the downstream of the ammonia production catalyst module 35 is rich, the controller 90 determines that the OSC of the ammonia production catalyst module 35 is completely consumed.

The first temperature sensor 62 detects the temperature of the exhaust gas at the upstream of the SCR catalyst 50 and transmits the signal corresponding thereto to the controller 90. The second temperature sensor 64 detects the temperature of the exhaust gas at the downstream of the SCR catalyst 50 and transmits the signal corresponding thereto to the controller 90. The controller 90 can calculate the temperatures of the TWC 30, the APC 40, the SCR catalyst 50, and the CUC 60 based on the signals of the first and second temperature sensors 62 and 64.

The air flowmeter 66 is mounted on an intake pipe or an intake duct to detect the amount of the air flowing into the intake system, and transmits the signal corresponding thereto to the controller 90.

The controller 90 controls operation of the engine 10 based on the values detected by the sensors 32, 34, 36, 62, 64 and 66. That is, the controller 90 can adjust the fuel injection amount to adjust the target AFR, and can delay the ignition timing for warming up the catalysts 30, 40, 50 and 60. Further, the controller 90 can control the rich AFR in multi-phases in response to detecting that the rich AFR is desired.

Figure 5:
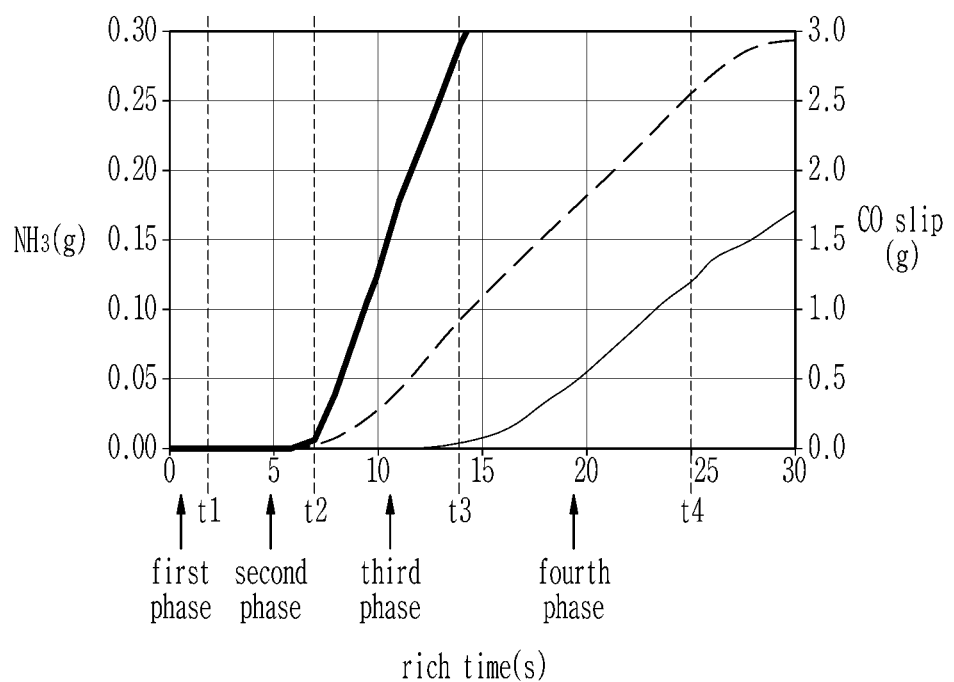
FIG. 5 is a graph showing $NH_3$ amount accumulated downstream of an ammonia production catalyst module over time, CO amount accumulated at the downstream of the ammonia production catalyst module over time, and the CO amount accumulated downstream of a CUC over time when an ARF is rich.

With reference to FIG. 5, a control strategy of an after treatment method according to an aspect of the present disclosure will be described.

FIG. 5 is a graph showing $NH_3$ amount accumulated at a downstream of an ammonia production catalyst module over time, CO amount accumulated at the downstream of the ammonia production catalyst module over time, and the CO amount accumulated at a downstream of a CUC over time when an ARF is rich. The graph illustrated in FIG. 5 is obtained by sequentially disposing the TWC 30, the particulate filter 70, the APC 40, the SCR catalyst 50, and the CUC 60 on the exhaust pipe 20 and operating the engine 10 at the rich AFR.

In FIG. 5, a thick solid line represents the $NH_3$ amount accumulated at the downstream of the ammonia production catalyst module 35 over time, a dotted line represents the CO amount accumulated at the downstream of the ammonia production catalyst module 35 over time, and a thin solid line represents the CO amount accumulated at the downstream of the CUC 60 over time.

As shown in FIG. 5, the OSC of the ammonia production catalyst module 35 is consumed from a time when the engine 10 is operated at the rich AFR to an OSC consuming time t2. In this case, although the AFR of the exhaust gas is rich, the AFR in the ammonia production catalyst module 35 is maintained to be lean due to the $O_2$ stored in the ammonia production catalyst module 35. Accordingly, the $NH_3$ is not generated in the ammonia production catalyst module 35 until the OSC of the ammonia production catalyst module 35 is completely consumed. In addition, the CO is not slipped from the ammonia production catalyst module 35 until the OSC of the ammonia production catalyst module 35 is completely consumed. Here, the OSC consuming time t2 refers to a period until the OSC of the ammonia production catalyst module 35 is completely consumed.

In the meantime, the OSC consuming time is related to a degree of richness of the AFR. For example, if the AFR is deeply rich (e.g., $\lambda<0.90$), the OSC consuming time may be shortened, but the HC may be slipped from the ammonia production catalyst module 35. On the contrary, if the AFR is slightly rich (e.g., $\lambda>0.97$), the HC is not slipped from the ammonia production catalyst module 35, but the OSC consuming time is prolonged. Further, even if the AFR is deeply rich, the HC is not slipped from the ammonia production catalyst module 35 during a predetermined duration t1. Here, the predetermined duration t1 refers to a period for which the HC is not slipped from the ammonia production catalyst module 35 at a deeply rich AFR.

If the OSC consuming time t2 elapses, the ammonia production catalyst module 35 begins to generate the $NH_3$. The $NH_3$ generated in the ammonia production catalyst module 35 is stored in the SCR catalyst 50. Further, if the OSC consuming time t2 elapses, the CO begins to be slipped from the ammonia production catalyst module 35. The CO slipped from the ammonia production catalyst module 35 is purified by the CUC 60 until a delay time t3 elapses. Therefore, the CO is hardly slipped from the CUC 60 until the delay time t3 elapses. Here, the delay time t3 refers to a period when the CO begins to be slipped from the CUC 60.

If the delay time t3 elapses, the CO begins to be slipped from the CUC 60. An accumulated amount of the CO slipped from the CUC 60 increases in proportion to an elapsed time. Likewise, an accumulated amount of the $NH_3$ generated in the ammonia production catalyst module 35 also increases in proportion to the elapsed time. Therefore, if the AFR is kept to be rich until a rich duration t4 for which the slip amount of the CO accumulated at the downstream of the CUC 60 becomes a predetermined amount, the $NH_3$ amount generated in the ammonia production catalyst module 35 can be further increased. Here, the rich duration t4 refers to a period until the accumulated amount of the CO slipped from the CUC 60 becomes the predetermined amount.

Thus, in order to increase the amount of the $NH_3$ generation while reducing the slip amount of the CO and the HC within a given time, the rich AFR can be controlled in the multiple-phases.

For example, the rich AFR can be controlled in three phases. A first phase is a period from the time when the engine 10 is operated at the rich AFR to the predetermined duration t1, and consuming of the OSC in the ammonia production catalyst module 35 is accelerated at the first phase. A second phase is a period from the predetermined duration t1 to the OSC consuming time t2, and the OSC is completely consumed at the second phase. A third phase is a period from the OSC consuming time t2 to the delay time t3. At the third phase, the ammonia production catalyst module 35 generates the $NH_3$ and the generated $NH_3$ is stored in the SCR catalyst 50.

Alternatively, a rich control of fourth phase may be performed to further increase the $NH_3$ generation. A fourth phase is a period from the delay time t3 to the rich duration t4, and $NH_3$ is further generated at the fourth phase.

With reference to FIG. 6 to FIG. 9, an after treatment method according to an aspect of the present disclosure will hereinafter be described.

Figure 6:
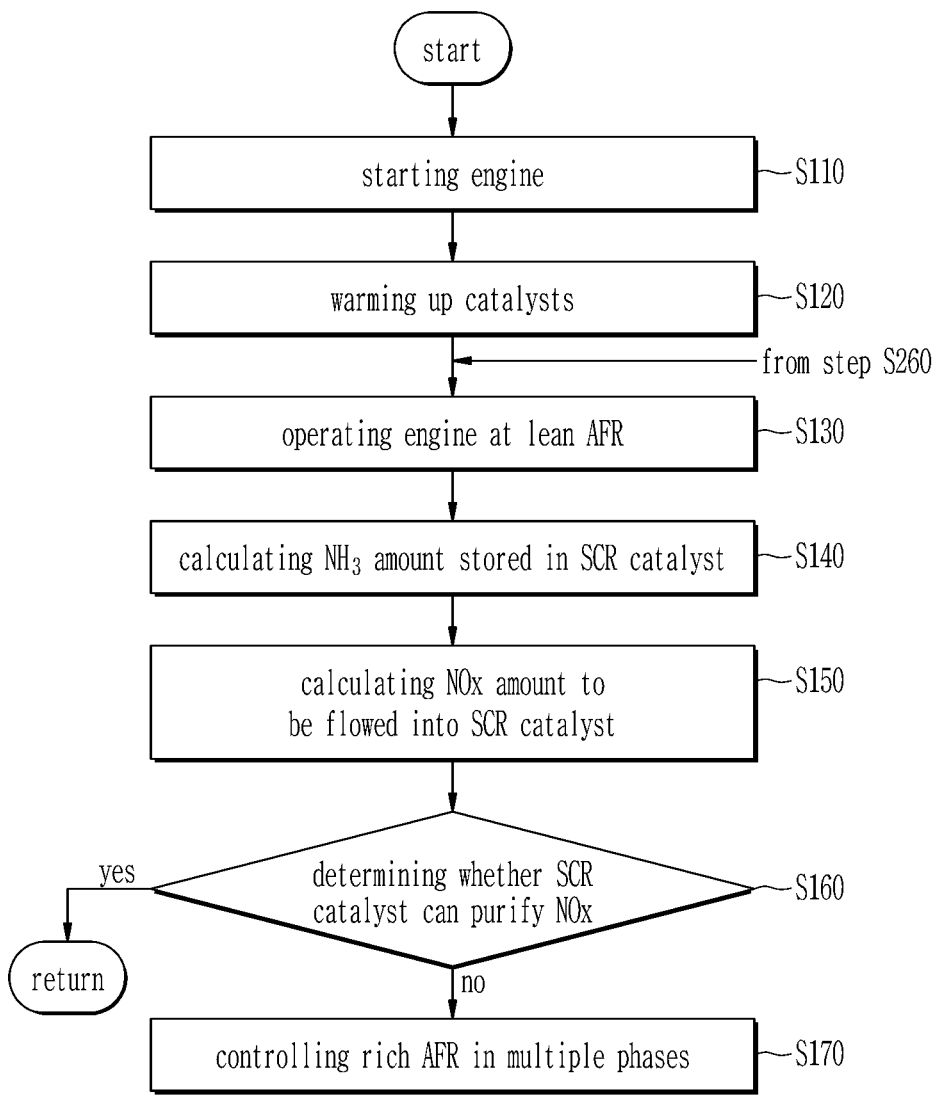
FIG. 6 is a flowchart of an after treatment method according to an aspect of the present disclosure.
Figure 7:
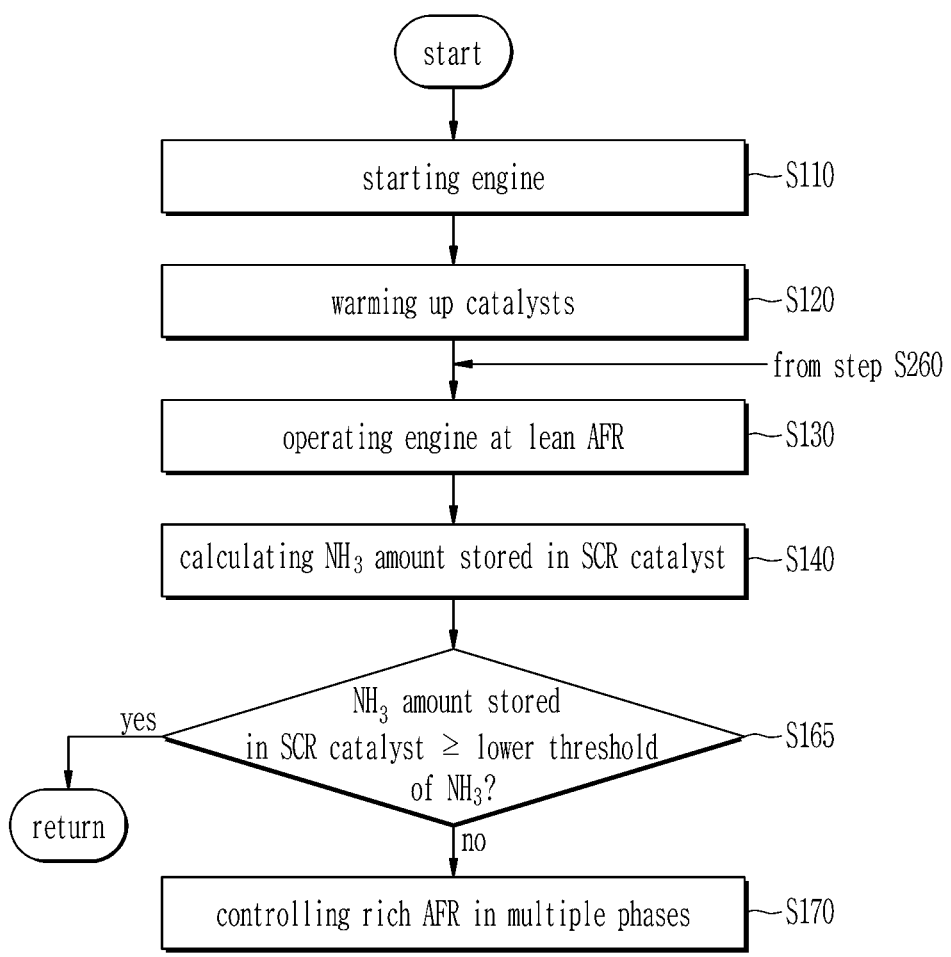
FIG. 7 is a flowchart of an after treatment method according to another aspect of the present disclosure.

FIG. 6 is a flowchart of an after treatment method according to an exemplary aspect of the present disclosure; and FIG. 7 is a flowchart of an after treatment method according to another aspect of the present disclosure.

As shown in FIG. 6, when the engine 10 is started at step S110, the controller 90 calculates the temperatures of the catalysts 30, 40, 50 and 60. In order to carry out the after treatment method according to the aspect of the present disclosure, the catalysts 30, 40, 50 and 60 may be activated. Accordingly, the controller 90 warms up the catalysts 30, 40, 50 and 60 at step S120 if the catalysts 30, 40, 50 and 60 are not activated. That is, the ignition timing is delayed or the amount of the fuel injection is increased to increase the temperature of the exhaust gas.

When warming-up of the catalyst 30, 40, 50, and 60 is completed, the controller 90 operates the engine 10 at the lean AFR at step S130. Therefore, the TWC 30 purifies the CO and the HC contained in the exhaust gas and the particulate filter 70 collects the particulate matter contained in the exhaust gas.

The controller 90 calculates the amount of the $NH_3$ stored in the SCR catalyst 50 at step S140. That is, the amount of the $NH_3$ stored in the SCR catalyst 50 is calculated based on operation history of the engine 10, temperature history of the SCR catalyst 50, and the like.

After that, the controller 90 determines whether the rich AFR is desirable, that is conversion to the rich AFR is desirable based on the amount of the $NH_3$ stored in the SCR catalyst 50.

In one aspect, in order to determine whether the conversion to the rich AFR is desirable, the controller 90 calculates the amount of the NOx to be flowed into the SCR catalyst 50 at step S150. The amount of the NOx generated in the engine 10 is calculated based on a combustion state (e.g., a combustion temperature, a combustion pressure, the air amount, the fuel amount, etc.) of the engine 10, and the amount of the NOx slipped from the ammonia production catalyst module 35 is calculated based on the AFR of the exhaust gas, the temperature of the TWC 30, the temperature of the APC 40, etc.

Thereafter, the controller 90 determines whether the SCR catalyst 50 can purify the NOx at step S160. That is, it is determined whether the amount of the $NH_3$ stored in the SCR catalyst 50 is sufficient to purify the NOx flowing into the SCR catalyst 50. For example, if the amount of the $NH_3$ stored in the SCR catalyst 50 is greater than or equal to an amount of the $NH_3$ required to purify the NOx to be flowed into the SCR catalyst 50, the controller 90 determines that the SCR catalyst 50 can purify the NOx.

If the SCR catalyst 50 can purify the NOx at the step S160, the controller 90 finishes the after treatment method according to the aspect of the present disclosure. In this case, the engine 10 is operated at the lean AFR.

If the SCR catalyst 50 cannot purify the NOx at the step S160 (i.e., the amount of the $NH_3$ stored in the SCR catalyst 50 is not sufficient to purify the NOx to be flowed into the SCR catalyst 50), the controller 90 determines that the conversion to the rich AFR is desired. After that, the controller 90 controls the rich AFR in the multiple phases at step S170.

In another aspect, as shown in FIG. 7, in order to determine whether the conversion to the rich AFR is desired, the controller 90 determines whether the amount of the $NH_3$ stored in the SCR catalyst 50 is greater than or equal to a lower threshold of the $NH_3$ at step S165.

If the amount of the $NH_3$ stored in the SCR catalyst 50 is greater than or equal to the lower threshold of the $NH_3$ at the step S165, the controller 90 finishes the after treatment method according to the aspect of the present disclosure and operates the engine 10 at the lean AFR.

If the amount of the $NH_3$ stored in the SCR catalyst 50 is less than the lower threshold of the $NH_3$ at the step S165, the controller 90 determines that the conversion to the rich AFR is desired. After that, the controller 90 controls the rich AFR in the multiple phases at the step S170.

Figure 8:
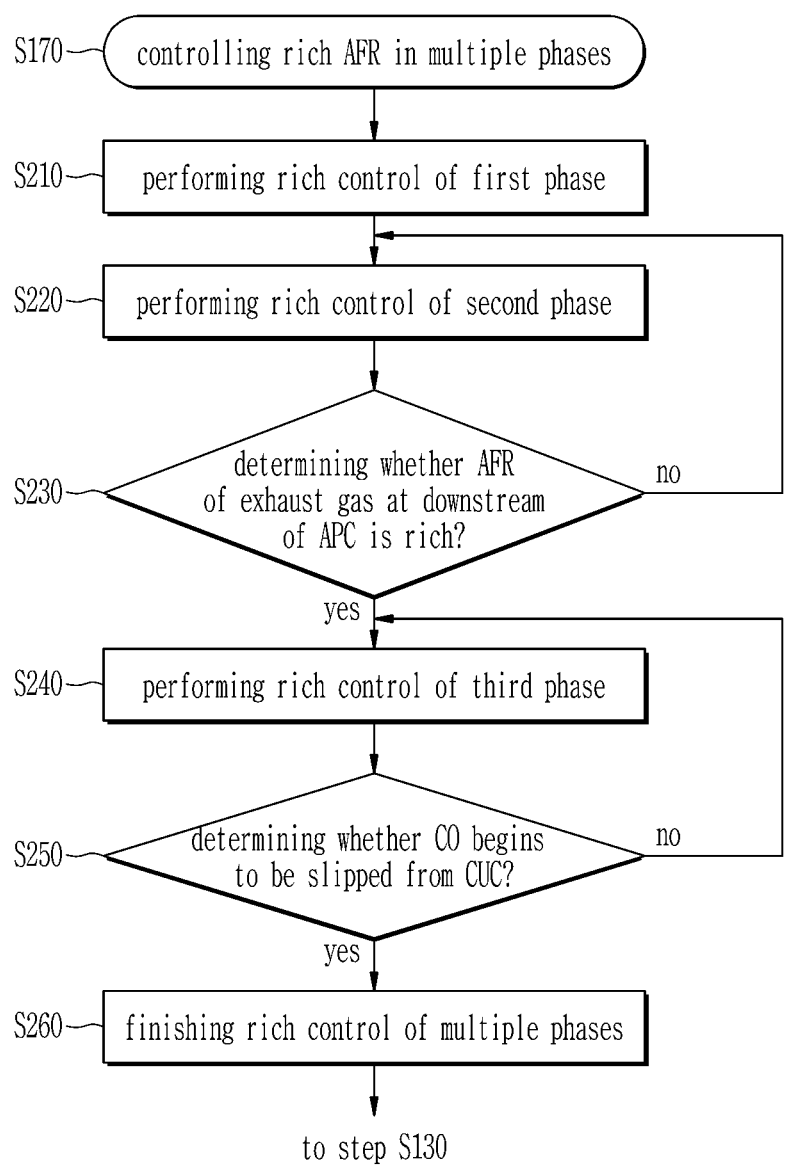
FIG. 8 is a flowchart of a rich control of multiple phases according to one aspect.
Figure 9:
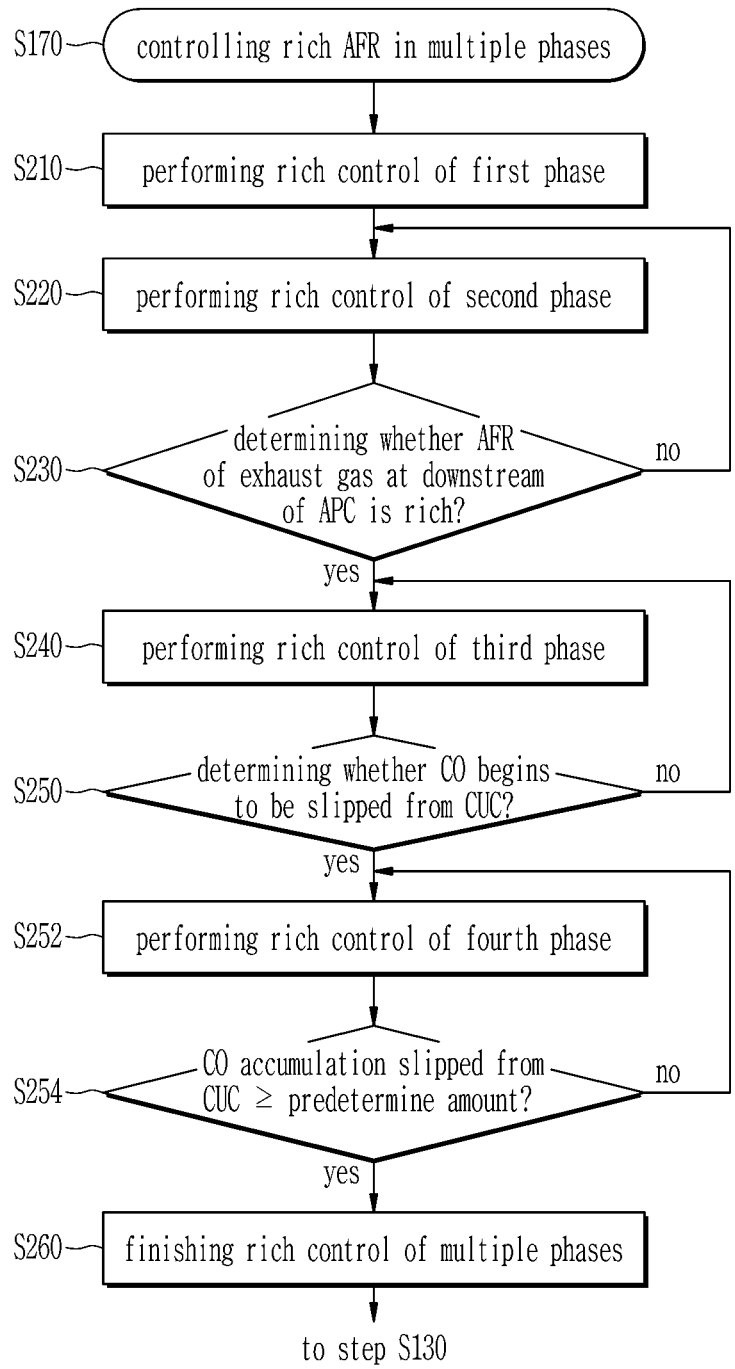
FIG. 9 is a flowchart of a rich control of multiple phases according to another aspect.

With reference to FIG. 8 to FIG. 9, the step S170 will hereinafter be described in detail.

FIG. 8 is a flowchart of a rich control of multiple phases according to one aspect.

As shown in FIG. 8, the rich control of multiple phases is started at the step S170, the controller 90 performs the rich control of first phase for the predetermined duration t1 at step S210. Thus, consumption of the OSC in the ammonia production catalyst module 35 is accelerated. The rich control of first phase is performed by controlling the AFR of the exhaust gas to be a first AFR, and the first AFR is a deeply rich AFR. In one aspect, the first AFR may be less than 0.90 based on the detected value of the first oxygen sensor 32. In another aspect, the first AFR may be greater than or equal to 0.87 and less than 0.9 based on the detected value of the first oxygen sensor 32. The predetermined duration t1 is a period during which the HC is not slipped from the ammonia production catalyst module 35 even if the engine 10 is operated at the first AFR, and may be set in advance. In one aspect, the predetermined duration t1 may be within one second. In another aspect, the predetermined duration t1 may be a value between 0.3 seconds and 0.7 seconds. In other aspect, the predetermined duration t1 may be 0.5 seconds. The predetermined duration t1 may be calculated according to the first AFR and the OSC of the ammonia production catalyst module 35.

After performing the rich control of first phase for the predetermined duration t1, the controller 90 performs the rich control of second phase to the OSC consuming time t2 at step S220. Thus, the OSC of the ammonia production catalyst module 35 is completely consumed. The rich control of second phase is performed by controlling the AFR of the exhaust gas to be a second AFR, and the second AFR may be greater than the first AFR based on the detected value of the first oxygen sensor 32. In one aspect, the second AFR may be 0.945 or more and less than 0.97 based on the detected value of the first oxygen sensor 32. In another aspect, the second AFR may be 0.945 or more and 0.95 or less based on the detected value of the first oxygen sensor 32. In other aspect, the second AFR may be 0.95 based on the detected value of the first oxygen sensor 32. If the second AFR is less than 0.94, the HC may be slipped from the ammonia production catalyst module 35. On the other hand, if the second AFR is 0.97 or more, the OSC consuming time t2 becomes longer.

During performing the rich control of second phase, the controller 90 determines whether the AFR of the exhaust gas at the downstream of the ammonia production catalyst module 35 is rich at step S230. That is, the controller 90 determines whether the OSC consuming time t2 has elapsed. If the OSC of the ammonia production catalyst module 35 is completely consumed by performing the rich control of first phase and the rich control of second phase, the AFR of the exhaust gas at the downstream of the ammonia production catalyst module 35 becomes rich. Thereby, the detected value of the third oxygen sensor 36 becomes less than 1. Thus, the controller 90 determines whether the AFR of the exhaust gas at the downstream of the ammonia production catalyst module 35 is rich based on the detected value of the third oxygen sensor 36.

If the AFR of the exhaust gas at the downstream of the ammonia production catalyst module 35 is not rich at the step S230, the controller 90 returns to the step S220 and continues to perform the rich control of the second phase.

If the AFR of the exhaust gas at the downstream of the ammonia production catalyst module 35 is rich at the step S230, the controller 90 performs the rich control of third phase to the delay time t3 at step S240. Thus, the ammonia production catalyst module 35 generates the $NH_3$ until the CO begins to be slipped from the CUC 60. The rich control of third phase is performed by controlling the AFR of the exhaust gas to be a third AFR, and the third AFR may be greater than the second AFR based on the detected value of the first oxygen sensor 32. In one aspect, the third AFR may be 0.965 or more and less than 0.985 based on the detected value of the first oxygen sensor 32. In another aspect, the third AFR may be 0.97 or more and 0.98 or less based on the detected value of the first oxygen sensor 32. In other aspect, the AFR may be 0.975 based on the detected value of the first oxygen sensor 32. If the third AFR is less than 0.965, the delay time t3 is shortened. Therefore, the $NH_3$ amount generated in the ammonia production catalyst module 35 during the delay time t3 may be reduced. If the third AFR is greater than 0.985, the $NH_3$ amount generated in the ammonia production catalyst module 35 is reduced.

During performing the rich control of third phase, the controller 90 determines whether the CO begins to be slipped from the CUC 60 at step S250. In one aspect, a CO sensor (not shown) is mounted at the downstream of the CUC 60, and the controller 90 determines whether the CO begins to be slipped from the CUC 60 based on the CO amount detected by the CO sensor. In another aspect, the delay time t3 according to the third AFR and the temperature of the CUC 60 is stored in a map, and the controller 90 determines whether the CO begins to be slipped from the CUC 60 by determining whether a period for which the rich AFR is maintained is equal to the delay time t3 stored in the map.

If it is determined at the step S250 that the CO is not slipped from the CUC 60, the controller 90 returns to the step S240 and continues to perform the rich control of third phase.

If it is determined at the step S250 that the CO begins to be slipped from the CUC 60, the controller 90 finishes the rich control of multiple phases at step S260, and returns to the step S130. Thus, the engine 10 is operated at the lean AFR.

FIG. 9 is a flowchart of a rich control of multiple phases according to another aspect.

As shown in FIG. 9, the rich control of multiple phases according to another aspect further includes step S252 and step S254 in addition to the rich control of multiple phases according to the one aspect. That is, the controller 90 performs the steps S210 to S250, and further performs the steps S252 and S254.

If it is determined at the step S250 that the CO begins to be slipped from the CUC 60, the controller 90 performs the rich control of fourth phase to the rich duration t4 at step S252. Thus, until a cumulative amount of the CO slipped from the CUC 60 becomes the predetermined amount, the ammonia production catalyst module 35 further generates the $NH_3$. The rich control of fourth phase is performed by controlling the AFR of the exhaust gas to be a fourth AFR, and the fourth AFR may be greater than the third AFR based on the detected value of the first oxygen sensor 32. That is, the first AFR, the second AFR, the third AFR, and the fourth AFR become larger in this order based on the detected value of the first oxygen sensor 32. In one aspect, the fourth AFR may be 0.975 or more and 0.99 or less based on the detected value of the first oxygen sensor 32. In another aspect, the fourth AFR may be 0.985 or more and 0.99 or less based on the detected value of the first oxygen sensor 32. In other aspect, the fourth AFR may be 0.985 based on the detected value of the first oxygen sensor 32. If the fourth AFR is less than 0.975, the rich duration t4 is shortened. This means that the CO amount slipped from the CUC 60 is increased. On the other hand, if the fourth AFR is greater than 0.99, the $NH_3$ amount generated in the ammonia production catalyst module 35 is reduced.

During performing the rich control of fourth phase, the controller 90 determines whether the cumulative amount of the CO slipped from the CUC 60 is greater than or equal to the predetermined amount at step S254. For example, the predetermined amount may be 0.1 g, but is not limited thereto. In one aspect, a CO sensor is mounted to the downstream of the CUC 60, and the controller 90 determines whether the cumulative amount of the CO slipped from the CUC 60 is greater than or equal to the predetermined amount based on the CO amount detected by the CO sensor. In another aspect, the rich duration t4 according to the fourth AFR and the temperature of the CUC 60 is stored in a map, and the controller 90 determines whether the cumulative amount of the CO slipped from the CUC 60 is greater than or equal to the predetermined amount by determining whether a period for which the rich AFR is maintained is equal to the rich duration t4 stored in the map.

If the cumulative amount of the CO slipped from the CUC 60 is less than the predetermined amount at the step S254, the controller 90 returns to the step S252 and continues to perform the rich control of fourth phase.

If the cumulative amount of the CO slipped from the CUC 60 is greater than or equal to the predetermined amount at the step S254, the controller 90 finishes the rich control of multiple phases at the step S260, and returns to the step S130. Thus, the engine 10 is operated at the lean AFR.

Examples

Hereinafter, the performance of the after treatment method according to the aspects of the present disclosure will be described through various examples and comparative examples. The predetermined times and the AFRs of various examples and comparative examples are shown in [Table 1].

TABLE 1

| | first phase | second phase | third phase | fourth phase |
|---|---|---|---|---|
| Example 1 | 0.89 (0.5 sec.) | 0.95 | 0.975 | — |
| Example 2 | 0.89 (0.5 sec.) | 0.95 | 0.975 | 0.985 |
| Comparative Example 1 | 0.95 | 0.95 | 0.975 | — |
| Comparative Example 2 | 0.89 (0.7 sec.) | 0.95 | 0.975 | — |
| Comparative Example 3 | 0.89 (0.9 sec.) | 0.95 | 0.975 | — |
| Comparative Example 4 | 0.89 (1.1 sec.) | 0.95 | 0.975 | — |
| Comparative Example 5 | 0.89 (1.3 sec.) | 0.95 | 0.975 | — |
| Comparative Example 6 | 0.89 (0.5 sec.) | 0.935 | 0.975 | — |
| Comparative Example 7 | 0.89 (0.5 sec.) | 0.94 | 0.975 | — |
| Comparative Example 8 | 0.89 (0.5 sec.) | 0.945 | 0.975 | — |
| Comparative Example 9 | 0.89 (0.5 sec.) | 0.955 | 0.975 | — |
| Comparative Example 10 | 0.89 (0.5 sec.) | 0.95 | 0.965 | — |
| Comparative Example 11 | 0.89 (0.5 sec.) | 0.95 | 0.97 | — |
| Comparative Example 12 | 0.89 (0.5 sec.) | 0.95 | 0.98 | — |
| Comparative Example 13 | 0.89 (0.5 sec.) | 0.95 | 0.985 | — |
| Comparative Example 14 | 0.89 (0.5 sec.) | 0.95 | 0.99 | — |
| Comparative Example 15 | 0.89 (0.5 sec.) | 0.95 | 0.975 | 0.975 |
| Comparative Example 16 | 0.89 (0.5 sec.) | 0.95 | 0.975 | 0.98 |
| Comparative Example 17 | 0.89 (0.5 sec.) | 0.95 | 0.975 | 0.99 |
| Comparative Example 18 | 0.89 (0.5 sec.) | 0.95 | 0.975 | 0.995 |

In each cell, the AFR of the exhaust gas based on the detected value of the first oxygen sensor 32 is described, and the predetermined duration is described in parentheses of the second column. The rich control of multiple phases according to the one aspect is performed in Examples 1 to 2 and Comparative Examples 1 to 14 (see FIG. 8), and the rich control of multiple phases according to another aspect is performed in Comparative Examples 15 to 18 (See FIG. 9). Comparative Example 1 is used to compare the effect of the rich control of first phase, Comparative Examples 2 to 5 are used to compare the effects according to the predetermined duration, Comparative Examples 6 to 9 are used to compare the effects according to the second AFR, Comparative Examples 10 to 14 are used to compare the effects according to the third AFR, and Comparative Examples 15 to 18 are used to compare the effects according to the fourth AFR.

(Test Method)

The TWC 30, the GPF 70, the APC 40, the SCR catalyst 50, and the CUC 60 are sequentially disposed on the exhaust pipe 20. After that, 2.0 L, 4-cylinders, lean-burn gasoline engine is connected to the exhaust pipe 20 and aging treatment is performed. The aging treatment is carried out at 1,000° C. on the TWC 30 basis for 50 hours.

The lean AFR ($\lambda=1.8$) is maintained for 5 minutes at an engine speed of 2,000 rpm to cause the entire after treatment system to be lean atmosphere. Thereafter, the rich control of multiple phases is performed at the engine speed of 2000 rpm.

Figure 10:
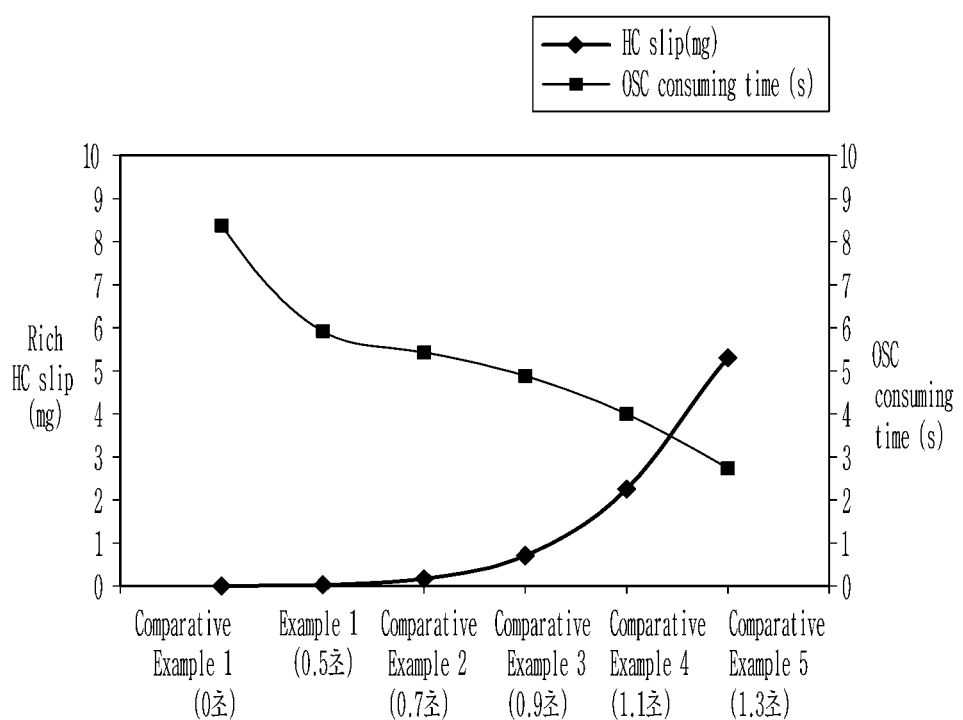
FIG. 10 is a graph showing HC amount slipped from an ammonia production catalyst module and OSC consuming time of the ammonia production catalyst module according to a predetermined duration for which a rich control of first phase is performed.

FIG. 10 is a graph showing HC amount slipped from an ammonia production catalyst module and OSC consuming time of the ammonia production catalyst module according to a predetermined duration for which a rich control of first phase is performed.

In FIG. 10, a thin solid line represents the OSC consuming time t2, and a thick solid line represents the HC amount slipped from the ammonia production catalyst module 35 during performing the rich control of multiple phases according to the one aspect.

As shown in FIG. 10, in Comparative Example 1 in which the rich control of first phase is not performed, the HC is not slipped from the ammonia production catalyst module 35, but the OSC consuming time t2 is very long (about 9 seconds). If the rich control of first phase is performed for 0.5 seconds or more, the OSC consuming time t2 becomes 6 seconds or less (in Example 1 and Comparative Examples 2 to 5). However, if the rich control of first phase is performed for 0.7 seconds or more, the HC is slipped from the ammonia production catalyst module 35. In particular, it can be seen that if the rich control of first phase is performed for 1.1 seconds or more, the HC slipped from the ammonia production catalyst module 35 increases sharply. The rich control of first phase may be performed for the predetermined duration t1 in order to shorten the OSC consuming time and reduce the HC amount slipped from the ammonia production catalyst module 35. In one aspect, the predetermined duration t1 may be within 1 second. In another aspect, the predetermined duration t1 may be a value between 0.3 seconds and 0.7 seconds. In other aspect, the predetermined duration t1 may be 0.5 seconds.

Figure 11:
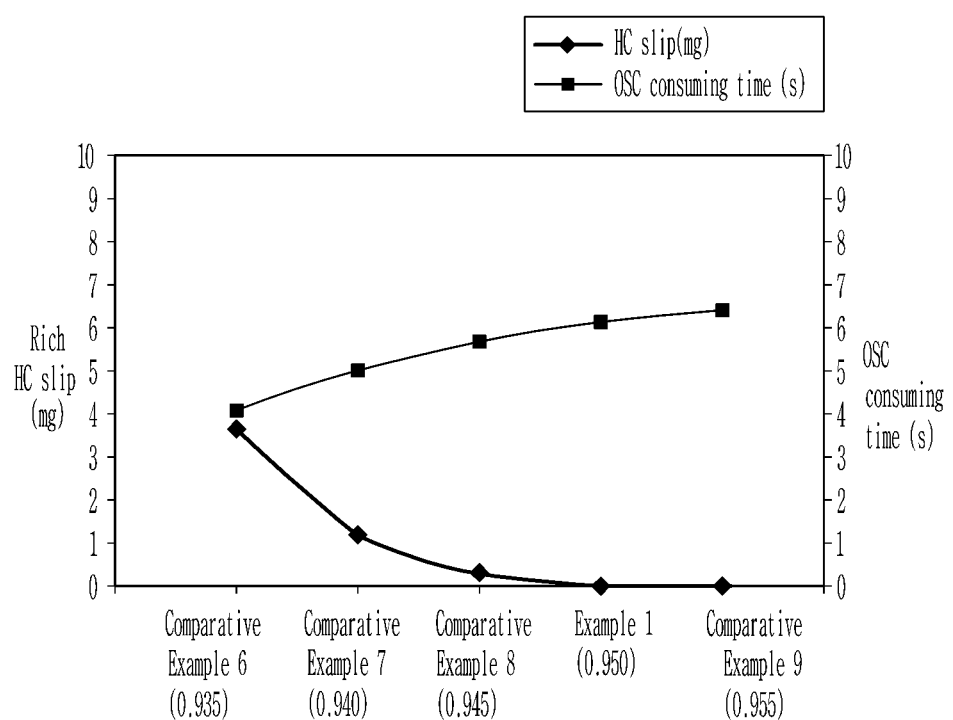
FIG. 11 is a graph showing HC amount slipped from an ammonia production catalyst module and OSC consuming time of the ammonia production catalyst module according to a second AFR.

FIG. 11 is a graph showing HC amount slipped from an ammonia production catalyst module and OSC consuming time of the ammonia production catalyst module according to a second AFR.

In FIG. 11, a thin solid line represents the OSC consuming time t2, and a thick solid line represents the HC amount slipped from the ammonia production catalyst module 35 during performing the rich control of multiple phases according to the one aspect.

As shown in FIG. 11 if the second AFR is increased based on the detected value of the first oxygen sensor 32, the OSC consuming time t2 gradually increases but the HC amount slipped from the ammonia production catalyst module 35 decreases. If the second AFR is 0.94 or less based on the detected value of the first oxygen sensor 32 (in Comparative Examples 6 and 7), the HC amount slipped from the ammonia production catalyst module 35 is considerably great. If the second AFR exceeds 0.97 based on the detected value of the first oxygen sensor 32, the OSC consuming time t2 becomes considerably long. Accordingly, the second AFR may be 0.945 or more and be less than 0.97 based on the detected value of the first oxygen sensor 32, in order to shorten the OSC consuming time and reduce the HC amount slipped from the ammonia production catalyst module 35. In another aspect, the second AFR may be 0.945 or more and 0.95 or less based on the detected value of the first oxygen sensor 32. In other aspect, the second AFR may be 0.95 based on the detected value of the first oxygen sensor 32.

Figure 12:
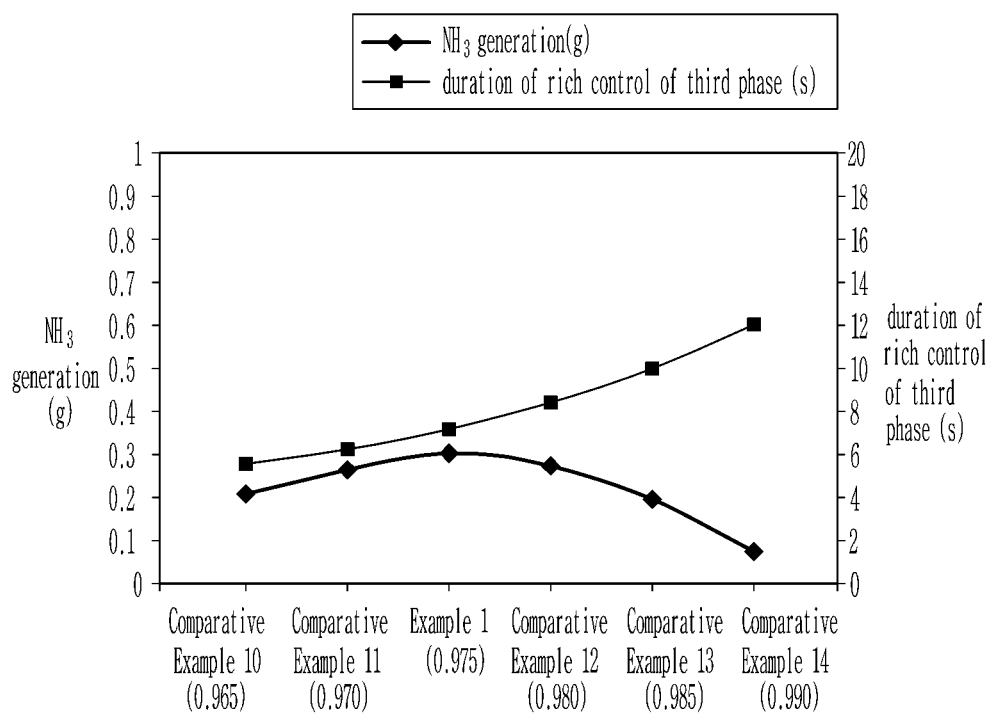
FIG. 12 is a graph showing $NH_3$ amount generated in an ammonia production catalyst module and a duration for which a rich control of third phase is performed according to a third AFR.

FIG. 12 is a graph showing NH$_3$ amount generated in an ammonia production catalyst module and a duration for which a rich control of third phase is performed according to a third AFR.

In FIG. 12, a thin solid line represents a duration (i.e., t3–t2) for which the rich control of third phase is performed, and a thick solid line represents the NH$_3$ amount generated in the ammonia production catalyst module 35 during the rich control of multiple phases according to the one aspect is performed.

As shown in FIG. 12, as the third AFR based on the detected value of the first oxygen sensor 32 is increased, the duration for which the rich control of third phase is performed also increases. However, if the third AFR based on the detected value of the first oxygen sensor 32 is increased, the NH$_3$ amount generated in the ammonia production catalyst module 35 increases and then decreases. The NH$_3$ amount generated in the ammonia production catalyst module 35 is the greatest at the third AFR of 0.975 based on the detected value of the first oxygen sensor 32. In particular, as the third AFR based on the detected value of the first oxygen sensor 32 increases from 0.975, the NH$_3$ amount generated in the ammonia production catalyst module 35 decreases. Therefore, in order to increase the NH$_3$ amount generated in the ammonia production catalyst module 35, the third AFR may be 0.965 or more and be less than 0.985 based on the detected value of the first oxygen sensor 32. In another aspect, the third AFR may be 0.97 or more and 0.98 or less based on the detected value of the first oxygen sensor 32. In other aspect, the third AFR may be 0.975 based on the detected value of the first oxygen sensor 32.

Figure 13:
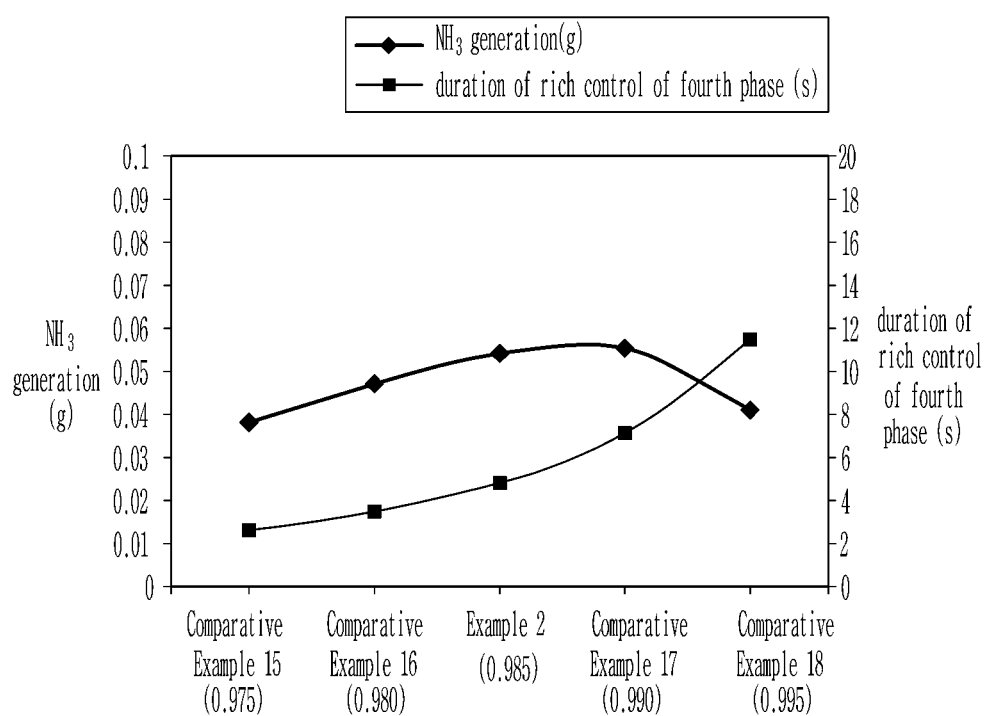
FIG. 13 is a graph showing $NH_3$ amount generated in an ammonia production catalyst module and a duration for which a rich control of fourth phase is performed according to a fourth AFR.

FIG. 13 is a graph showing NH$_3$ amount generated in an ammonia production catalyst module and a duration for which a rich control of fourth phase is performed according to a fourth AFR.

In FIG. 13, a thin solid line represents a duration (i.e., t4–t3) for which the rich control of fourth phase is performed, and a thick solid line represents the NH$_3$ amount generated in the ammonia production catalyst module 35 during the rich control of multiple phases according to another aspect is performed.

As shown in FIG. 13, as the fourth AFR based on the detected value of the first oxygen sensor 32 is increased, the duration for which the rich control of fourth phase is performed also increases. Particularly, if the fourth AFR based on the detected value of the first oxygen sensor 32 is greater than 0.985, the duration for which the rich control of fourth phase is performed is long. However, if the fourth AFR based on the measured value of the first oxygen sensor 32 is increased, the NH$_3$ amount generated in the ammonia production catalyst module 35 increases and then decreases. The NH$_3$ amount generated in the ammonia production catalyst module 35 is the greatest at the fourth AFR of 0.990 based on the detected value of the first oxygen sensor 32. In particular, as the fourth AFR based on the detected value of the first oxygen sensor 32 increases from 0.990, the NH$_3$ amount generated in the ammonia production catalyst module 35 sharply decreases. Therefore, in order to increase the NH$_3$ amount generated in the ammonia production catalyst module 35 without increasing the duration for which the rich control of fourth phase is performed, the fourth AFR may be set to a value of 0.975 or more and 0.99 or less based on the detected value of the first oxygen sensor 32. In another aspect, the fourth AFR may be 0.985 or more and 0.99 or less based on the detected value of the first oxygen sensor 32. In other aspect, the fourth AFR may be 0.985 based on the detected value of the first oxygen sensor 32.

While this disclosure has been described in connection with what is presently considered to be practical aspects, it is to be understood that the disclosure is not limited to the disclosed aspects. On the contrary, it is intended to cover various modifications and equivalent arrangements.

What is claimed is:

1. An after treatment system for a lean-burn engine, comprising:

an exhaust pipe connected to the lean-burn engine and through which an exhaust gas generated in the lean-burn engine flows;

an ammonia production catalyst module mounted on the exhaust pipe, capable of purifying emission contained in the exhaust gas, and generating ammonia ($NH_3$) using nitrogen oxide (NOx) contained in the exhaust gas or NOx stored therein at a rich air/fuel ratio (AFR);

a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$;

a CO clean-up catalyst (CUC) mounted on the exhaust pipe downstream of the SCR catalyst and purifying CO contained in the exhaust gas; and a controller detecting information on the AFR and temperature of the exhaust gas and controlling the AFR of the exhaust gas based on the information on the AFR and the temperature of the exhaust gas, wherein, in response to detecting information that the rich AFR is desirable, the controller is configured to sequentially perform a rich control of first phase in which consumption of oxygen storage capacity (OSC) in the ammonia production catalyst module is accelerated, a rich control of second phase in which the OSC is completely consumed, and a rich control of third phase in which the $NH_3$ is generated before the CO is slipped from the CUC, wherein the AFR is controlled to be a first AFR in the rich control of first phase, the AFR is controlled to be a second AFR in the rich control of second phase, and the AFR is controlled to be a third AFR in the rich control of third phase, wherein the first AFR is greater than the second AFR, and the second AFR is greater than the third AFR based on a detected value of an oxygen sensor mounted at an upstream of the ammonia production catalyst module.

2. An after treatment system for a lean-burn engine, comprising:

an exhaust pipe connected to the lean-burn engine and through which an exhaust gas generated in the lean-burn engine flows;

an ammonia production catalyst module mounted on the exhaust pipe, capable of purifying emission contained in the exhaust gas, and generating ammonia ($NH_3$) using nitrogen oxide (NOx) contained in the exhaust gas or NOx stored therein at a rich air/fuel ratio (AFR);

a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$;

a CO clean-up catalyst (CUC) mounted on the exhaust pipe downstream of the SCR catalyst and purifying CO contained in the exhaust gas; and a controller detecting information on the AFR and temperature of the exhaust gas and controlling the AFR of the exhaust gas based on the information on the AFR and the temperature of the exhaust gas, wherein, in response to detecting information that the rich AFR is desirable, the controller is configured to sequentially perform a rich control of first phase in which consumption of oxygen storage capacity (OSC) in the ammonia production catalyst module is accelerated, a rich control of second phase in which the OSC is completely consumed, and a rich control of third phase in which the $NH_3$ is generated before the CO is slipped from the CUC, wherein the AFR is controlled to be a first AFR in the rich control of first phase, the AFR is controlled to be a second AFR in the rich control of second phase, and the AFR is controlled to be a third AFR in the rich control of third phase, wherein the controller further performs a rich control of fourth phase in which the $NH_3$ is further generated to a rich duration at which a slip amount of the CO accumulated downstream of the CUC reaches a predetermined amount.

3. The after treatment system of claim 2, wherein the AFR is controlled to be a fourth AFR in the rich control of fourth phase, and wherein the fourth AFR is greater than the first AFR to the third AFR based on a detected value of an oxygen sensor mounted at an upstream of the ammonia production catalyst module.

4. The after treatment system of claim 3, wherein the rich duration is calculated according to the fourth AFR and a temperature of the CUC.

5. The after treatment system of claim 2, wherein the rich control of first phase is performed for a predetermined duration.

6. The after treatment system of claim 5, wherein the predetermined duration is calculated according to the OSC and the first AFR.

7. The after treatment system of claim 2, wherein the ammonia production catalyst module comprises:

a three-way catalyst (TWC) purifying hydrocarbon (HC), the CO, and the NOx contained in the exhaust gas; and an ammonia production catalyst (APC) mounted on the exhaust pipe downstream of the TWC, storing the NOx at a lean AFR, and generating H2, releasing the stored NOx, and generating the $NH_3$ using the released NOx and the generated H2 at the rich AFR.

8. The after treatment system of claim 7, further comprising a particulate filter disposed between the TWC and the APC or between the APC and the SCR catalyst, wherein the particulate filter traps particulate matter in the exhaust gas.

9. An after treatment method for controlling an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine, the after treatment method comprising:

operating the engine at a lean AFR;

calculating an amount of $NH_3$ stored in the SCR catalyst;

determining whether conversion to a rich AFR is desired;

operating, when the conversion to the rich AFR is desired, the engine at a first AFR for a predetermined duration; and operating the engine at a second AFR until oxygen storage capacity (OSC) in the ammonia production catalyst module is completely consumed, wherein the first AFR is less than the second AFR based on a detected value of an oxygen sensor mounted at an upstream of the ammonia production catalyst module, wherein the predetermined duration is calculated according to the OSC and the first AFR.

10. The after treatment method of claim 9, wherein the determining whether conversion to a rich AFR is desired includes calculating an amount of NOx which will flow into the SCR catalyst, and wherein the conversion to the rich AFR is determined to be desired when the amount of the $NH_3$ stored in the SCR catalyst is smaller than an amount of the $NH_3$ required to purify the amount of the NOx which will flow into the SCR catalyst.

11. The after treatment method of claim 9, wherein the determining whether conversion to a rich AFR is desired includes comparing the amount of the $NH_3$ stored in the SCR catalyst with a predetermined $NH_3$ lower threshold, and wherein the conversion to the rich AFR is determined to be desired when the amount of the $NH_3$ stored in the SCR catalyst is smaller than the predetermined $NH_3$ lower threshold.

12. The after treatment method of claim 9, further comprising operating the engine at a third AFR before CO is slipped from the CUC.

13. The after treatment method of claim 12, wherein the third AFR is greater than the second AFR based on a detected value of an oxygen sensor mounted at an upstream of the ammonia production catalyst module.

14. The after treatment method of claim 12, further comprising operating the engine at a fourth AFR to a rich duration at which a slip amount of the CO accumulated downstream of the CUC reaches a predetermined amount.

15. The after treatment method of claim 14, wherein the fourth AFR is greater than the first AFR to the third AFR based on a detected value of an oxygen sensor mounted at an upstream of the ammonia production catalyst module.

16. The after treatment method of claim 14, wherein the rich duration is calculated according to the fourth AFR and a temperature of the CUC.

* * * * *